(12) United States Patent
Govindappanavar et al.

(10) Patent No.: US 10,346,213 B2
(45) Date of Patent: *Jul. 9, 2019

(54) SELECTIVE AND PIECEMEAL DATA LOADING FOR COMPUTING EFFICIENCY

(71) Applicant: International Business Machines Corporation, Armonk, NY (US)

(72) Inventors: Dattatreya Govindappanavar, Hirekerur (IN); Apoorv Kapse, Bangalore (IN); Gaurav Saxena, Bangalore (IN); Uttam Setty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 733 days.

This patent is subject to a terminal disclaimer.

(21) Appl. No.: 14/977,707

(22) Filed: Dec. 22, 2015

(65) Prior Publication Data

US 2017/0083592 A1    Mar. 23, 2017

Related U.S. Application Data

(63) Continuation of application No. 14/862,604, filed on Sep. 23, 2015, now Pat. No. 9,965,328.

(51) Int. Cl.
| | |
|---|---|
| *G06F 17/30* | (2006.01) |
| *G06F 9/50* | (2006.01) |
| *G06F 16/25* | (2019.01) |
| *G06F 16/28* | (2019.01) |
| *G06F 16/23* | (2019.01) |

(52) U.S. Cl.
CPC ........ *G06F 9/5038* (2013.01); *G06F 16/2379* (2019.01); *G06F 16/254* (2019.01); *G06F 16/284* (2019.01)

(58) Field of Classification Search
None
See application file for complete search history.

(56) References Cited

U.S. PATENT DOCUMENTS

| 6,189,011 B1 | 2/2001 | Lim et al. |
| 6,542,813 B1 | 4/2003 | Kovacs |

(Continued)

OTHER PUBLICATIONS

"Optimizing of workload of ETL jobs based on resource availability on dependent Source, Target and ETL Infrastructure", An IP.com Prior Art Database Technical Disclosure, Authors et. al.: Disclosed Anonymously, IP.com No. 000230005, IP.com Electronic Publication: Aug. 13, 2013, 7 pages.

(Continued)

*Primary Examiner* — Umut Onat
(74) *Attorney, Agent, or Firm* — Isaac J. Gooshaw

(57) ABSTRACT

One or more processors determine a level of data usage for two or more types of data to be loaded in a relational database. One or more processors prioritize data of the two or more types for loading. One or more processors load data of the two or more types in an order based, at least in part, on the level of data usage for the two or more types of data. One or more processors load data of the two or more types into a table within the relational database, the data being loaded in two or more portions and at times based, at least in part, on an availability of computer resources.

1 Claim, 3 Drawing Sheets

(56) References Cited

U.S. PATENT DOCUMENTS

| | | |
|---|---|---|
| 6,910,053 B1 | 6/2005 | Pauly et al. |
| 9,116,929 B2 | 8/2015 | Morris et al. |
| 9,965,328 B2 * | 5/2018 | Govindappanavar ........................ G06F 9/5038 |
| 2002/0010614 A1 | 1/2002 | Arrowood |
| 2008/0133830 A1 | 6/2008 | Nitta et al. |
| 2009/0019093 A1 | 1/2009 | Brodersen et al. |
| 2013/0151558 A1 | 6/2013 | Chercoles Sanchez et al. |
| 2014/0114924 A1 | 4/2014 | Abed et al. |
| 2014/0325151 A1 | 10/2014 | Kim et al. |
| 2015/0040133 A1 | 2/2015 | Caufield et al. |
| 2015/0261572 A1 | 9/2015 | Caufield et al. |

OTHER PUBLICATIONS

Appendix P List of IBM Patents or Applications Treated as Related. Filed on Dec. 30, 2016. Two pages.
Original U.S. Appl. No. 14/862,604, filed Sep. 23, 2015.

* cited by examiner

SELECTIVE AND PIECEMEAL DATA LOADING FOR COMPUTING EFFICIENCY

BACKGROUND OF THE INVENTION

The present invention relates generally to the field of database management, and more particularly to directed data loading.

A database management system (DBMS) is a computer software application that interacts with the user, other applications, and the database itself to capture and analyze data. A general-purpose DBMS is designed to allow the definition, creation, querying, update, and administration of databases.

A relational database management system (RDBMS) is a DBMS that is based on the relational model as invented by Edgar F. Codd. Many popular databases currently in use are based on the relational database model. RDBMSs are a common choice for the storage of information in new databases used for financial records, manufacturing and logistical information, personnel data, and other applications since the 1980s. Relational databases have often replaced legacy hierarchical databases and network databases because they are easier to understand and use.

The data in relational databases are stored in database objects called tables. The table is a collection of related data entries and it consists of columns and rows. When data is loaded into a relational database, columns and rows of tables are populated with the data.

SUMMARY

Embodiments of the present invention provide a method, system, and program product for selective and piecemeal data loading. One or more processors determine a level of data usage for two or more types of data to be loaded in a relational database. One or more processors prioritize data of the two or more types for loading, wherein data of a first data type has a higher priority for loading than data of a second data type when the first data type has a higher level of data usage than the second data type. One or more processors load data of the two or more types in an order based, at least in part, on the level of data usage for the two or more types of data. One or more processors prioritize data of the two or more high-priority types for loading, wherein data of a first high-priority data type has a higher priority for loading than data of a second high-priority data type based, at least in part, on one or more of: an amount of data to be loaded, a number of types of data to be loaded, and a time requirement for data to be loaded. One or more processors load data of the two or more types into a table within the relational database, the data being loaded in two or more portions and at times based, at least in part, on an availability of computer resources.

DETAILED DESCRIPTION

The loading of data from a first database into a second database requires computing resources that would typically be used for other tasks such as, for example, querying the very data that is being loaded into the second database. Most computing tasks that require data stored in the rows based on a column layout of a database table do not need data from all of the columns and rows. For example, tables in relational databases have different types of data in the different columns of the tables. The type of data in any particular column is described by the field that heads that column. Data populating some columns is often used much more heavily during typical computing tasks as compared to data in other columns. Thus, many computing tasks can be performed using database tables that are partially loaded.

Embodiments of the present invention recognize that many database operations utilize only a fraction of the data in a particular table. Embodiments of the present invention recognize that some types of data are much more heavily used in most database operations compared to other types of data. Embodiments of the present invention provide for the piecemeal loading of higher priority data into a database prior to loading lower priority data thereby allowing many database operations to be performed without waiting for complete data loading. Embodiments of the present invention provide various filtering techniques that are used to identify high priority data based on a determined priority associated with that data. For example, a number of programs are waiting for a given data. As such, a priority is assigned to that data depending on whether a variety of thresholds are met or exceeded based on the number of programs that are waiting for that data. Data entries, with assigned priorities, are then filtered to determine a ranking for the data based on those priorities.

The present invention will now be described in detail with reference to the Figures.

Figure 1:
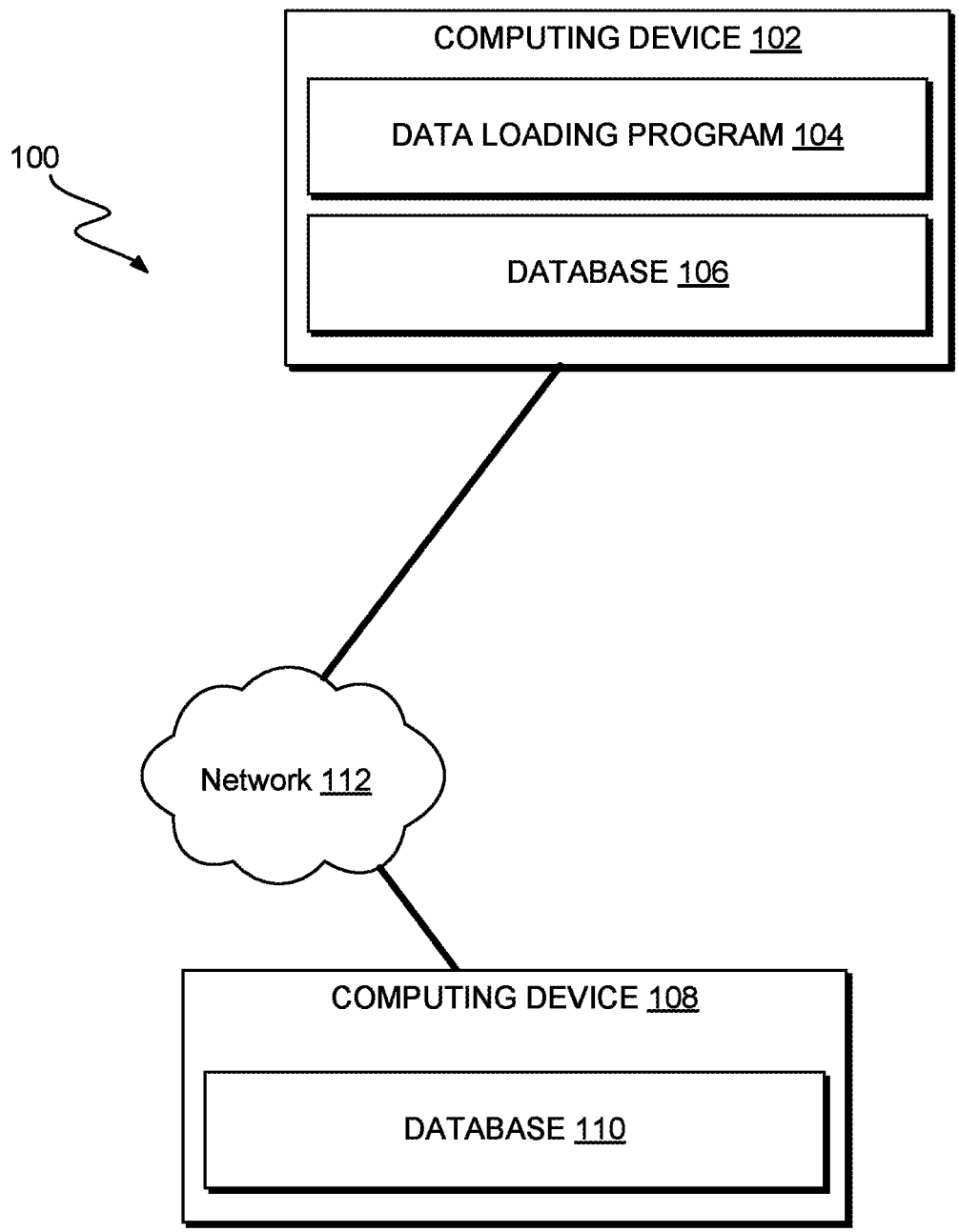
FIG. 1 is a functional block diagram illustrating a data-selective database loading environment, in accordance with an exemplary embodiment of the present invention.

FIG. 1 is a functional block diagram illustrating a data-selective database loading environment, generally designated 100, in accordance with one embodiment of the present invention. Data-selective database loading environment 100 includes computing device 102 and computing device 108 connected over network 112. Computing device 102 includes data loading program 104 and database 106. Computing device 108 includes database 110.

In various embodiments of the present invention, computing devices 102 and 108 are computing devices that can be a standalone devices, servers, laptop computers, tablet computers, netbook computers, personal computers (PCs), or desktop computers. In one embodiment of the present invention, computing devices 102 and 108 are a single computing device. In another embodiment, computing devices 102 and 108 represent computing systems utilizing clustered computers and components to act as a single pool of seamless resources. In general, computing devices 102 can be any computing device or a combination of devices with access to data loading program 104, database 106, and database 110 and is capable of executing data loading program 104. Computing devices 102 and 108 may include internal and external hardware components, as depicted and described in further detail with respect to FIG. 3.

In this exemplary embodiment, data loading program 104 and database 106 are stored on computing device 102 and database 110 is stored on computing device 108. However, in other embodiments, data loading program 104, database 106, and database 110 may be stored externally and accessed through a communication network, such as network 112. Network 112 can be, for example, a local area network (LAN), a wide area network (WAN) such as the Internet, or a combination of the two, and may include wired, wireless, fiber optic or any other connection known in the art. In general, network 112 can be any combination of connections and protocols that will support communications between computing device 102, data loading program 104, database 106, computing device 108, and database 110 in accordance with a desired embodiment of the present invention.

In exemplary embodiments, data loading program 104 analyzes past utilization of types of data that are to be loaded into one or both database 106 and database 110 and loads data piecemeal with the most heavily utilized types of data being loaded first. By loading the most heavily utilized types of data first, the table(s) being populated in one or both database 106 and database 110 are capable of being exploited by numerous computing tasks even though all of the data has yet to be loaded.

In exemplary embodiments, database 106 and database 110 represent any databases or sources of data that are capable of one or more: receiving, providing, and exchanging data, the types of which experience varying degrees of utilization by computing tasks.

Figure 2:
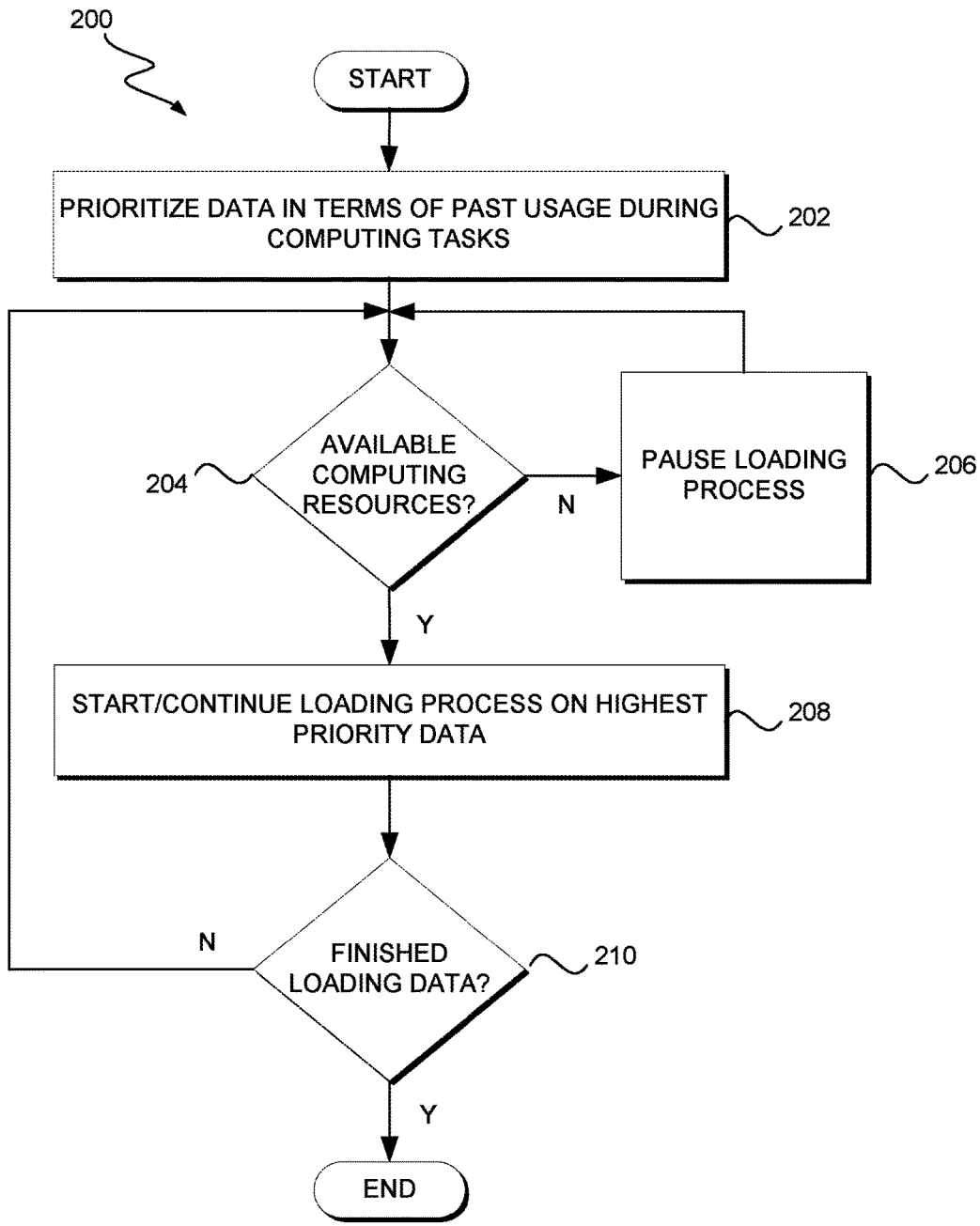
FIG. 2 illustrates operational processes for loading data in a piecemeal and selective manner, on a computing device within the environment of FIG. 1, in accordance with an exemplary embodiment of the present invention.

FIG. 2 illustrates operational processes, generally designated 200, for loading data in a piecemeal and selective manner, on a computing device within the environment of FIG. 1, in accordance with an exemplary embodiment of the present invention.

In step 202, data loading program 104 prioritizes data to be loaded into database 106 from database 110 or into database 110 from database 106. In various embodiments, data loading program 104 prioritizes the data in terms of how often the data will be used for future computer tasks. In one embodiment, data loading program 104 determines how often the data will be used by analyzing past usage of substantially similar data. In other embodiments, data loading program 104 follows a user-entered priority order for various types of data.

In one general example, data loading program 104 is loading data into a growing table that is part of a relational database (i.e. database 106 and database 110 are relational databases). Data loading program 104 records past usage of older data within the growing table and determines via analysis of the records which types of data are used the most by computing tasks. Data loading program 104 creates a list of data types from most used data types to least used data types. Data to be loaded are then prioritized according to the priority rules derived from the list of most used to least used data types.

For example, database 106 is a relational database that has a growing database table with the following fields: Employee number, employee address, employee salary, and employee joining date. In this example, database 106 is going to receive more data of these types from database 110. Data loading program 104 determines via analytics of past queries on the growing database table of database 106 that the order of fields from the most queried to the least queried is the following: Employee number>employee salary>employee joining date>employee address. As a result of this analysis, data loading program 104 prioritizes employee number data to be received from database 110 ahead of employee salary data to be received from database 110. Likewise, data loading program 104 prioritizes employee salary data to be received from database 110 ahead of employee joining date data to be received from database 110. Finally, employee joining date data to be received from database 110 is prioritized ahead of employee address data to be received from database 110 by data loading program 104.

In the previous example, data loading program 104 analyzed queries performed on data contained in database 106. The data was already present in database 106 prior to loading new data of the same type to be received from database 110. In another embodiment, data loading program 104 performs the same query analysis of queries performed on data contained within database 110 prior to loading data from database 110 into database 106. In this embodiment, the queries performed on data within database 110 provide the prioritization order of data types for loading onto database 106. In yet another embodiment, data loading program 104 analyzes queries performed on both database 106 and database 110 in order to determine the prioritization order of data types for loading onto database 106.

In the previous example, data loading program 104 managed the loading of data onto database 106, which resides on the same computing device as data loading program 104 according to the embodiment shown in FIG. 1. In another embodiment, data loading program 104 manages the loading of data onto database 110, which resides on a different computing device than data loading program 104.

In an example for another embodiment, a user is interested to querying employee joining date data and employee salary data from either database 106 or database 110. In this scenario, the user wants to analyze relationships between these two types of data and does not require identifying data such as employee number data or employee address data. As a result, the user enters a priority order for loading data that makes employee joining date data and employee salary data the highest priority for loading by data loading program 104. The employee number data and employee address data are given the lowest priority for loading by data loading program 104.

In decision step 204, data loading program 104 determines whether there are available computing resources on computing device 102 and computing device 108 in order to begin the data loading process. In various embodiments, the data loading process is an extract-transform-load (ETL) process.

The extract step involves data extraction from the source system and makes it accessible for further processing. The main objective of the extract step is to retrieve all the required data from the source system with as little resources as possible. In various embodiments, the extract step is designed in a way that it does not negatively affect the source system in terms or performance, response time or any kind of locking.

The transform step applies a set of rules to transform the data from the source to the target. This includes converting any measured data to the same dimension (i.e. conformed dimension) using the same units so that they can later be joined. In various embodiments, the transformation step also requires joining data from several sources, generating aggregates, generating surrogate keys, sorting, deriving new calculated values, and applying advanced validation rules.

In one embodiment, the target of the loading process is database 106. In another embodiment, the target of the loading process is database 110. In order to make the loading process efficient, data loading program 104 disables any constraints and indexes before the load or partial load step and enables them back only after the load or partial load step completes.

If data loading program 104 determines that there are not available computing resources on computing device 102 and computing device 108, then data loading program 104 pauses the loading process (step 206) until computing resources become available on computing devices 102 and 108. If data loading program 104 determines that there are available computing resources on computing devices 102 and 108, then data loading program 104 starts or continues loading of the highest priority unloaded data (step 208).

In step 208, data loading program 104 loads the highest priority unloaded data onto the target database. In various embodiments, data loading program 104 determines, using a threshold parameter, when a sufficient amount of data has been loaded into the target database to render it useful for a majority of computing tasks. Data loading program 104 makes this determination by analyzing the past usage data acquired in step 202 and extrapolating the success of past computing tasks if the past computing tasks had been conducted with the current partially loaded target database. In various embodiments, indexes of the partially loaded target database are then enabled so that complete records can be retrieved from the source database after a successful computer task on the partially loaded target database.

In various embodiments, data loading program 104 analyzes historical highs and lows of past periods of computer resource utilization to estimate how much data can be loaded during a current period of computer resource availability. Data loading program 104 then creates an order for loading high priority data types based on the size of the data to be loaded and, hence, the time requirement for loading the data. In one embodiment, data loading program 104 loads sets of high priority data types the choice of which is based on completely loading the maximum number of data types in the estimated time window. In another embodiment, data loading program 104 loads sets of high priority data types the choice of which is based on loading the largest data sets that can be successfully and completely loaded in the estimated time window.

In decision step 210, data loading program 104 determines whether the data types to be loaded has been loaded completely, including the lowest priority data types. In various embodiments, data loading program 104 reaches decision step 210 after each complete loading of a data type into the target database. In other embodiments, data loading program 104 reaches decision step 210 after completely loading a set of data types that were determined to be loadable in the estimated time window that was based on an analysis of historical highs and lows of past computer resource utilization (supra). In another embodiment, data loading program 104 reaches decision step 210 when data loading in causing poor computing performance and the cessation of data loading is required in order to improve computing performance. If all data has been loaded into the target database, then data ceases to be loaded by data loading program 104. If data remains to be loaded into the target database, then data loading program 104 waits for computing resources to become available in order to continue the loading of the highest priority remaining data.

Figure 3:
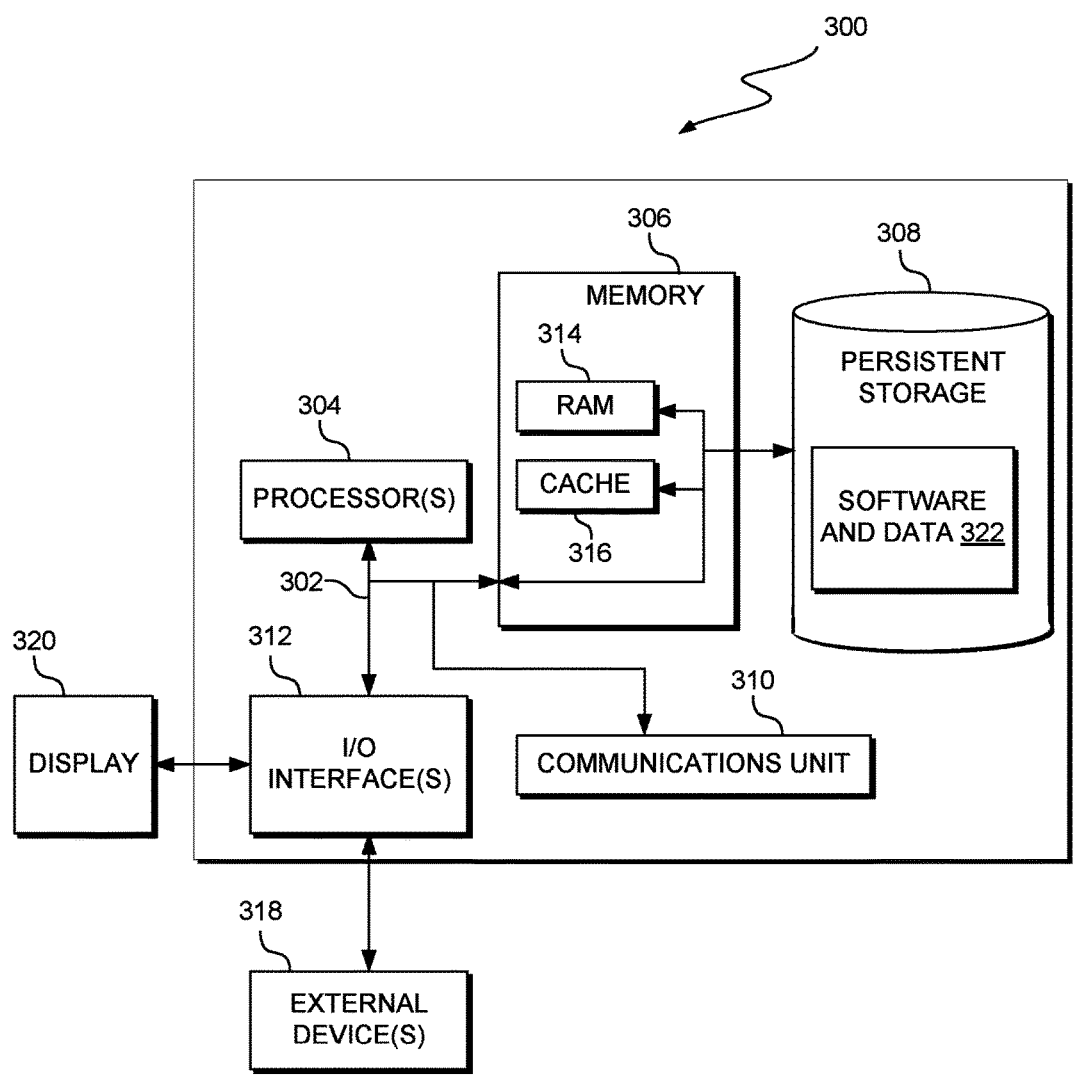
FIG. 3 depicts a block diagram of components of the computing device executing a data loading program, in accordance with an exemplary embodiment of the present invention.

FIG. 3 depicts a block diagram, 300, of components of computing devices 102 and 108, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing devices 102 and 108 each include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Software and data 322 (e.g., data loading program 104, database 106, and database 110) are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of network 112. In these examples, communications unit 310 includes one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computing devices 102 and 108. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., data loading program 104, database 106, and database 110, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as "SMALLTALK" and the like may be subject to trademark rights in various jurisdictions throughout the world and are used here only in reference to the products or services properly denominated by the marks to the extent that such trademark rights may exist.

What is claimed is:

1. A method comprising:

determining, by one or more processors, a level of data usage for two or more types of data to be loaded in a relational database;

prioritizing, by one or more processors, data of the two or more types for loading, wherein data of a first data type has a higher priority for loading than data of a second data type when the first data type has a higher level of data usage than the second data type;

loading, by one or more processors, data of the two or more types in an order based, at least in part, on the level of data usage for the two or more types of data;

prioritizing, by one or more processors, data of the two or more high-priority types for loading, wherein data of a first high-priority data type has a higher priority for loading than data of a second high-priority data type based, at least in part, on one or more of: an amount of data to be loaded, a number of types of data to be loaded, and a time requirement for data to be loaded;

partially loading, by one or more processors, data of the two or more types into a table within the relational database, the data being loaded (i) in two or more portions, (ii) at times based, at least in part, on an availability of computer resources, and (iii) based, at least in part, on a determination of priority for the two or more types of data; and utilizing, by the one or more processors, the partially loaded table within the relational database to execute a plurality of computing tasks that require at least two of the two or more types of data.

* * * * *